UNITED STATES PATENT OFFICE.

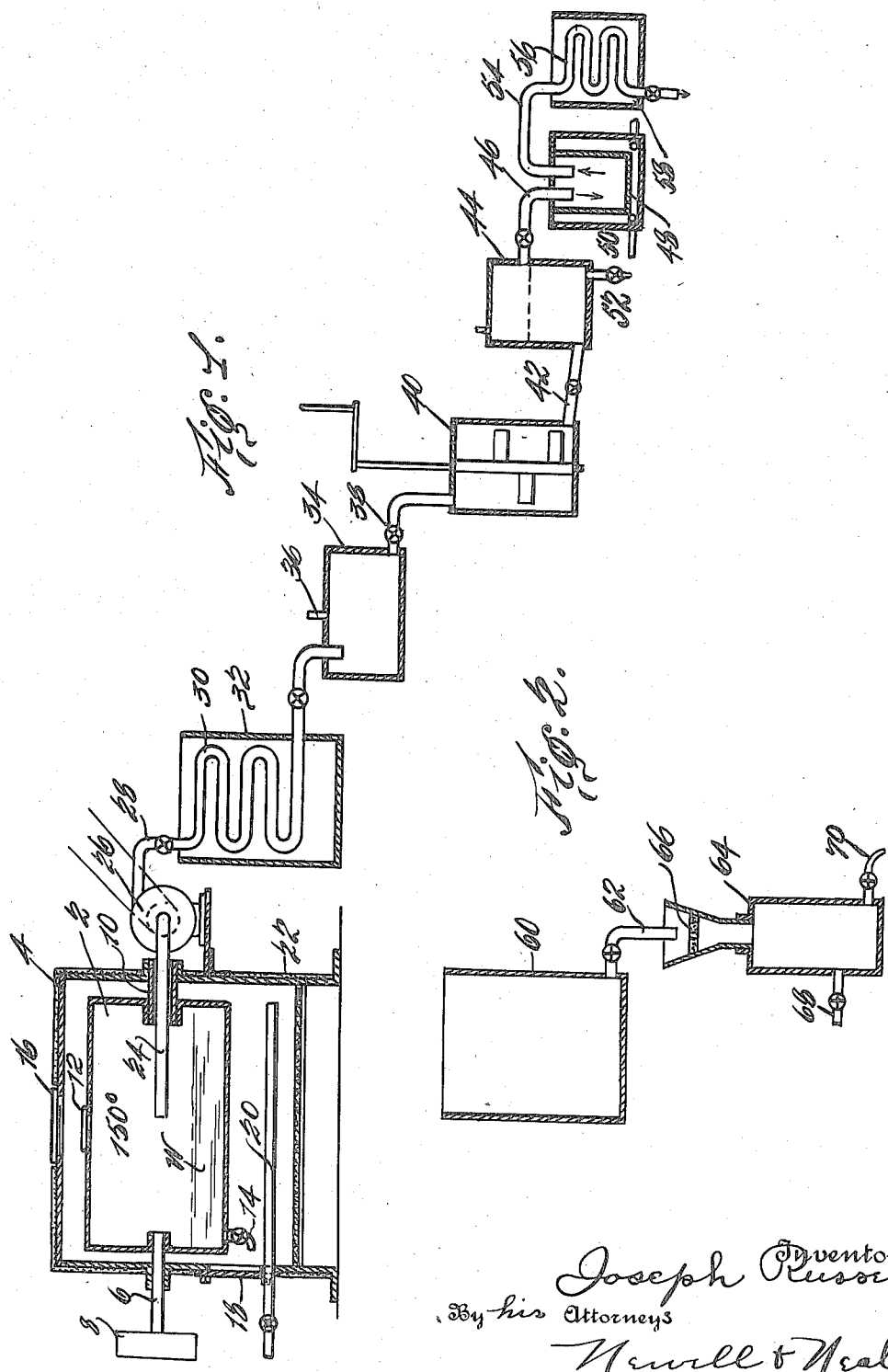

JOSEPH RUSSELL, OF NEW YORK, N. Y.

NON-ALCOHOLIC WINE AND PROCESS OF MAKING SAME.

1,264,564.  Specification of Letters Patent.  Patented Apr. 30, 1918.

Application filed July 5, 1917. Serial No. 178,524.

*To all whom it may concern:*

Be it known that I, JOSEPH RUSSELL, (formerly bearing the name of JOSEPH VON EPLER,) a subject of the King of Great Britain, residing at New York, N. Y., have invented Non-Alcoholic Wine and Processes of Making Same, of which the following is a clear, full, and exact description.

My invention relates to non-alcoholic wine and to a process of preparing such wine.

An object of my invention is the production of a wine which, while free from intoxicating qualities, possesses a characteristic wine bouquet and flavor. Other objects will appear from the following detailed description, taken in connection with the accompanying drawing.

Figures 1 and 2 represent illustrative arrangements of different parts of the apparatus used, it being understood that the drawing is merely diagrammatic and schematic, and not intended to exhibit the details of the commercial apparatus employed in carrying out the process.

Wine W, which may be port, sherry or other known or specially fermented wine, is placed in a hollow cylinder or drum 2 mounted within a cabinet 4, being rotatably supported therein by means of trunnions, one of which, 6, carries a pulley or gear wheel 8 for connection to an engine or motor; the other trunnion 10 is hollow. The drum 2 is provided with a filling opening 12 and emptying faucet 14, to which access may be had through the openings 16 and 18 in the cabinet 4. The cabinet is provided with heating means 20, which may be steam pipes or gas burners, and with a covering 22 of asbestos or other heat insulating means. A pipe 24 extends from about the middle of the drum 2 through the hollow trunnion 10 to the inlet opening of air pump 26, which discharges into a pipe 28 leading to a condensing coil 30 arranged within a refrigerating receptacle 32. It being undesirable, for the best results, to boil the wine, the heat in the cabinet 4 is adjusted to maintain the wine at a temperature not greatly exceeding 150° F. but still sufficient to vaporize the ethyl alcohol in the wine. The disengagement of the alcoholic vapors is aided by rotating the cylinder at a moderate speed so as to bring different portions of the wine to the surface and by the maintenance of a partial vacuum in the cylinder by means of the air pump 26. The vapors which are withdrawn from the cylinder by the air pump consist chiefly of vaporized ethyl alcohol but also contain a considerable portion of the etheric or aromatic principle of the wine. This etheric principle consists chiefly of volatile acids and compound esters and ethers, such as œnanthic ether, which give to the wine its flavor and bouquet. It is therefore desirable that these substances be separated from the condensate and returned to the unvaporized portion of the wine. This is accomplished in the following manner. The chilled condensate from the coil 30 is led into a receptacle 34 provided with a vent 36. From this receptacle the condensate is discharged through the pipe 38 into an agitator 40, where it is thoroughly mixed with about one-fifth of its weight of melted white vaseline which absorbs the etheric principle but does not absorb the alcohol. To produce thorough absorption of the non-alcoholic portions of the condensate the agitation should continue for about an hour. The mixture is conducted through the pipe 42 to a settling tank 44, where it is left for several hours until it separates into two layers, as indicated by the dotted line, the vaseline and non-alcoholic elements forming the upper layer and the alcohol the lower layer. The vaseline is drawn off through the pipe 46 into a receptacle 48 surrounded by a hot water or steam jacket 50, after which the alcohol may be discharged through the pipe 52. The vaseline in the receptacle 48 under the influence of the heat, gives off the etheric principle from the wine as vapors which are conducted through the pipe 54 to the condensing coil 56 in the container 58. The condensate from 56 and the unvaporized residue from the cylinder 2 are thoroughly mixed in a tank 60 having a faucet 62 discharging into a receptacle 64. This receptacle 64 is provided with a filter 66 through which the mixture from the faucet passes. The passage of the liquid through the filter may be facilitated and the quality of the product improved by maintaining a partial vacuum on the underside of the filter, by means of the pipe 68 connected to an air pump. From the receptacle 64 the filtered liquor is discharged through the faucet 70 and is received in sterilized bottles or other containers.

By the term alcohol as used in the preceding description and in the claims, I mean ethyl alcohol. The residue in the container 2 will in most cases contain small portions of the higher alcohols, such as butyl and propyl alcohols, as these vaporize at higher temperatures than that to which the wine is subjected. These alcohols, however, occur in very small quantites and do not need to be removed. More or less water will also be lost from the wine during the heating in the cylinder 2, and will be drawn off from the settling tank 44 with the alcohol.

It is to be understood that the apparatus will be provided where needed with valves, air vents, etc., as may be necessary or desirable for its efficient operation; also, that the apparatus shown in Fig. 1 may be divided into several groups, the product from one group being collected and supplied to the next group as may be desired, and that the number and capacity of each device may be varied to suit the circumstances of each installation. Moreover, the practice of my new process is not limited to the performance of the exact steps described, but, within the scope of the appended claims, may be modified by varying the number or nature of the operations involved or by the substitution of other agents for performing the functions set forth.

What I claim as new is:—

1. The process of de-alcoholizing wine, which consists in heating the wine to a temperature sufficient to vaporize the alcohol contained therein, withdrawing and condensing the alcoholic and other vapors produced by such heating, separating the etheric and like components from the condensate and returning said components to the unvaporized portion of the wine.

2. The process of de-alcoholizing wine, which consists in heating the wine, withdrawing and condensing the vapors produced by such heating, mixing the condensate with a selectively absorptive agent, separating said agent and the absorbed portions of the condensate from the residue of the condensate, separating the absorbed portions of the condensate from the absorptive agent, and returning the former to the unvaporized portion of the wine.

3. The process of de-alcoholizing wine, which consists in heating the wine, withdrawing and condensing the vapors produced by such heating, causing portions of said condensate to be absorbed in a body of vaseline, removing the unabsorbed portion of the condensate, separating the absorbed portion of the condensate from the vaseline, and returning the same to the unvaporized portion of the wine.

4. The process of de-alcoholizing wine, which consists in heating the wine, withdrawing and condensing the vapors produced by such heating, mixing the condensate with an agent which absorbs only non-alcoholic constituents of the condensate, separating the alcohol from the mixture, heating the residue of the mixture to expel the absorbed constituents therefrom, condensing said constituents and mixing them with the unvaporized portions of the wine.

5. The process of de-alcoholizing wine, which consists in agitating and heating the wine in a closed receptacle, drawing off the vapors which disengage from the wine, condensing said vapors, mixing the condensate with melted vaseline to cause the absorption of a portion of the condensate thereby, separating the vaseline from the unabsorbed portions of the condensate, heating the vaseline, withdrawing the vapors formed thereby and condensing the same, and mixing said condensate with the unvaporized portion of the wine.

6. The process of separating etheric and like compounds from vinous alcohol, which consists in intimately mixing the same with an agent which absorbs the etheric and like compounds but not the alcohol.

7. The process of separating etheric and like compounds from vinous alcohol, which consists in intimately mixing the same with vaseline.

Signed at New York, N. Y., this 2" day of July, 1917.

JOSEPH RUSSELL.